United States Patent [19]

Oberg et al.

[11] 4,323,313

[45] Apr. 6, 1982

[54] IMPREGNATOR SYSTEM

[75] Inventors: Robert E. Oberg; Clarence E. Stewart, both of South Sioux City, Nebr.; Thomas C. Geelan, Sioux City, Iowa

[73] Assignee: The Broyhill Company, Dakota City, Nebr.

[21] Appl. No.: 100,632

[22] Filed: Dec. 5, 1979

[51] Int. Cl.³ .................. B01F 15/04; G05D 11/02
[52] U.S. Cl. ............................ 366/142; 366/152; 366/160; 366/162; 366/167; 366/180; 366/182
[58] Field of Search ............... 366/150, 152, 160–162, 366/177, 182, 131, 134, 132, 135, 151, 142, 163, 167, 179, 180; 417/5, 43; 222/55, 59, 63

[56] References Cited

U.S. PATENT DOCUMENTS

| | | | |
|---|---|---|---|
| 3,266,780 | 8/1966 | Waters | 366/152 |
| 4,171,164 | 10/1979 | Groves et al. | 366/152 |
| 4,209,258 | 6/1980 | Oakes | 366/152 |

*Primary Examiner*—Philip R. Coe
*Assistant Examiner*—Timothy F. Simone
*Attorney, Agent, or Firm*—Zarley, McKee, Thomte, Voorhees & Sease

[57] ABSTRACT

An impregnator system is described for electronically measuring liquid chemicals from a plurality of independent pumping systems into a fertilizer blending tank or the like. A plurality of electrically driven pumps are provided and have their intakes in communication with sources of different liquid chemicals. Each of the pumps has a discharge line extending therefrom to a main discharge line which extends to the fertilizer mixing container. An electrical flow sensor is provided in the main discharge line for sensing the rate of flow therethrough. A batch control apparatus is operatively connected to the flow sensor and the pumps for initially activating one of the pumps and for deactivating the pump when a preselected volume of liquid chemical has passed through the flow sensor.

1 Claim, 4 Drawing Figures 4,323,313

IMPREGNATOR SYSTEM

BACKGROUND OF THE INVENTION

This invention relates to an impregnator system and more particularly to an impregnator system including a plurality of independent pumps which are controlled by a batch control means to supply preselected amounts of chemical to a fertilizer blending apparatus.

Fertilizer blending systems are commonly used in agricultural areas to enable a plant operator to custom mix a fertilizer having the desired ingredients. The blending systems commonly include weigh hoppers, conveyors and mixing drums. After the fertilizer has been blended and mixed, the dry fertilizer is spread over the land by some sort of spreading mechanism.

In recent years, it has been found that the dry fertilizer could be impregnated with chemicals such as herbicides or the like so that the herbicide would be applied to the ground at the same time that the fertilizer was being spread. It is extremely important that the proper amount of chemical be mixed with the fertilizer and a common practice has been to simply pour or dump a predetermined quantity of the liquid chemical into the mixing drum after the dry fertilizer ingredients had been placed therein. The requirement that the liquid chemical be manually poured into the mixing drum involved considerable time and labor.

In an effort to somewhat automate the addition of the liquid chemical into the dry fertilizer ingredients, some blenders have employed single pumps which pump the chemical into the mixing drum. The single pumps are in communication with a tank of the liquid chemical which has a predetermined amount of liquid chemical therein. In other words, if it was determined that 25 gallons of herbicide should be mixed with the dry fertilizer ingredients, the tank in communication with the pump would be filled with 25 gallons of the herbicide and the pump activated until the tank had been emptied.

Therefore, it is a principal object of the invention to provide an impregnator system for use with a fertilizer blending system which is capable of supplying a predetermined chemical at a predetermined rate to the fertilizer mixing drum with a minimum of effort and with a maximum of accuracy.

A still further object of the invention is to provide an impregnator system which is reliable.

A still further object of the invention is to provide an impregnator system including a batch controller which enables the operator to dial the units of volume to be supplied to the fertilizer.

A still further object of the invention is to provide an impregnator system which results in substantial savings and labor and money.

These and other objects will be apparent to those skilled in the art.

SUMMARY OF THE INVENTION

A plurality of independently driven pumps are in communication with sources of liquid chemicals. Each of the pumps is in communication with a primary discharge line which is in communication with the interior of a fertilizer mixing drum. A flow sensor is positioned in the primary discharge line for sensing the rate of flow therethrough. A batch controller is connected to the pumps and to the flow sensor for selectively activating one of the pumps to supply liquid chemical to the interior of the fertilizer mixing drum and for deactivating the pump when the flow sensor has sensed the preselected volume passing therethrough. The batch controller includes a plurality of rotatable dials to enable the operator to select the units of volume of the liquid chemical which are to be pumped through the primary discharge line to the mixing drum. The console also includes a readout of the desired volume as determined by the setting of the dials. A start button is also provided on the console for activating the selected pump. The controller includes electrical circuitry which counts down the units of volume displayed by the readout corresponding to the flow sensed by the flow sensor until the readout reaches zero at which time the electrical circuitry deactivates the pump.

DESCRIPTION OF THE PREFERRED EMBODIMENT

Figure 1:
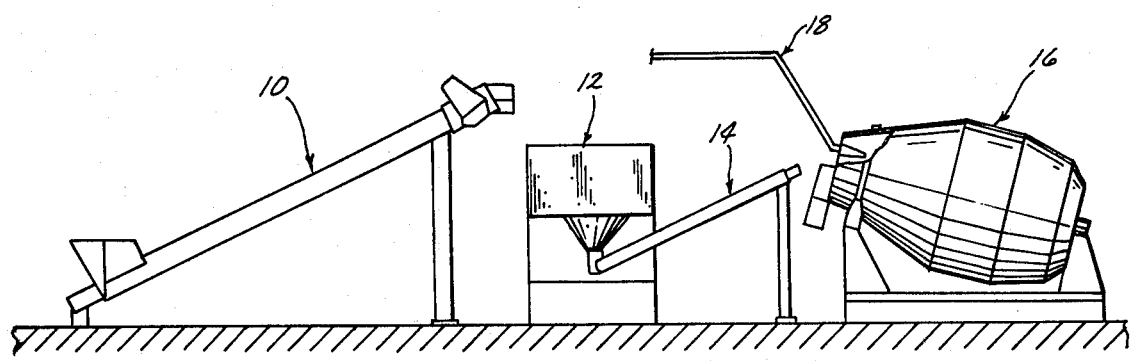
FIG. 1 is a side view of a typical fertilizer blending system having the chemical discharge line in communication with the fertilizer mixing drum.

FIG. 1 illustrates a typical fertilizer blending system comprising a conveyor means 10 which is adapted to convey fertilizer ingredients to a weigh hopper 12. Conveyor 14 extends from the weigh hopper 12 to the rotary mixing drum 16. Additional conveying means would normally be provided for conveying the mixed fertilizer from the drum 16 after the ingredients had been supplied thereto and thoroughly mixed. As seen in FIG. 1, the numeral 18 refers to a liquid discharge line which is in communication with the interior of the mixing drum.

The numeral 20 refers to a flow sensor means mounted in the line 18 downstream of the fittings 22, 24, 26 and 28. The flow sensor employed in this invention is the Model MK315 manufactured by Signet Scientific, 3401 Aerojet Avenue, El Monte, California 91734. The flow sensing means includes an open paddle wheel which does not affect the flow characteristics of the chemical being measured. The flow sensing means 20 will derive a linear signal which is supplied to the batch controller console 30 by means of the lead 32. The fittings 22, 24, 26 and 28 are provided with check valves 34, 36, 38 and 40 respectively to permit flow from the lines 42, 44, 46 and 48 respectively into the discharge line 18. Line 42, 44, 46 and 48 are in communication with the discharge side of pumps 50, 52, 54 and 56 respectively which are driven by the electric motors 58, 60, 62 and 64 respectively. The suction or intake sides of the pumps 50, 52, 54 and 56 are in communication with sources of liquid chemicals such as herbicides, fungicides, etc. Power cords 66, 68, 70 and 72 extend from the motors 58, 60, 62 and 64 respectively and are received by receptacles located on the back of the console box 30.

Console box 30 includes a manually rotatably dial 74 which may be moved to the four stations indicated by the numerals 1, 2, 3 and 4 which correspond to the individual pumping systems. Rotatable dials 76, 78 and 80 are provided to enable the operator to select the units of volume of the chemical which are to be supplied to the fertilizer. Start switch 82 is provided as is stop switch 84. The numeral 86 refers to a manual-automatic-off switch while the numeral 88 refers to an accumulator. The numeral 90 refers to a digital LED readout which will display the preselected units of volume as determined by the position of the dials, 76, 78 and 80 upon start switch 82 being depressed.

Figure 4:
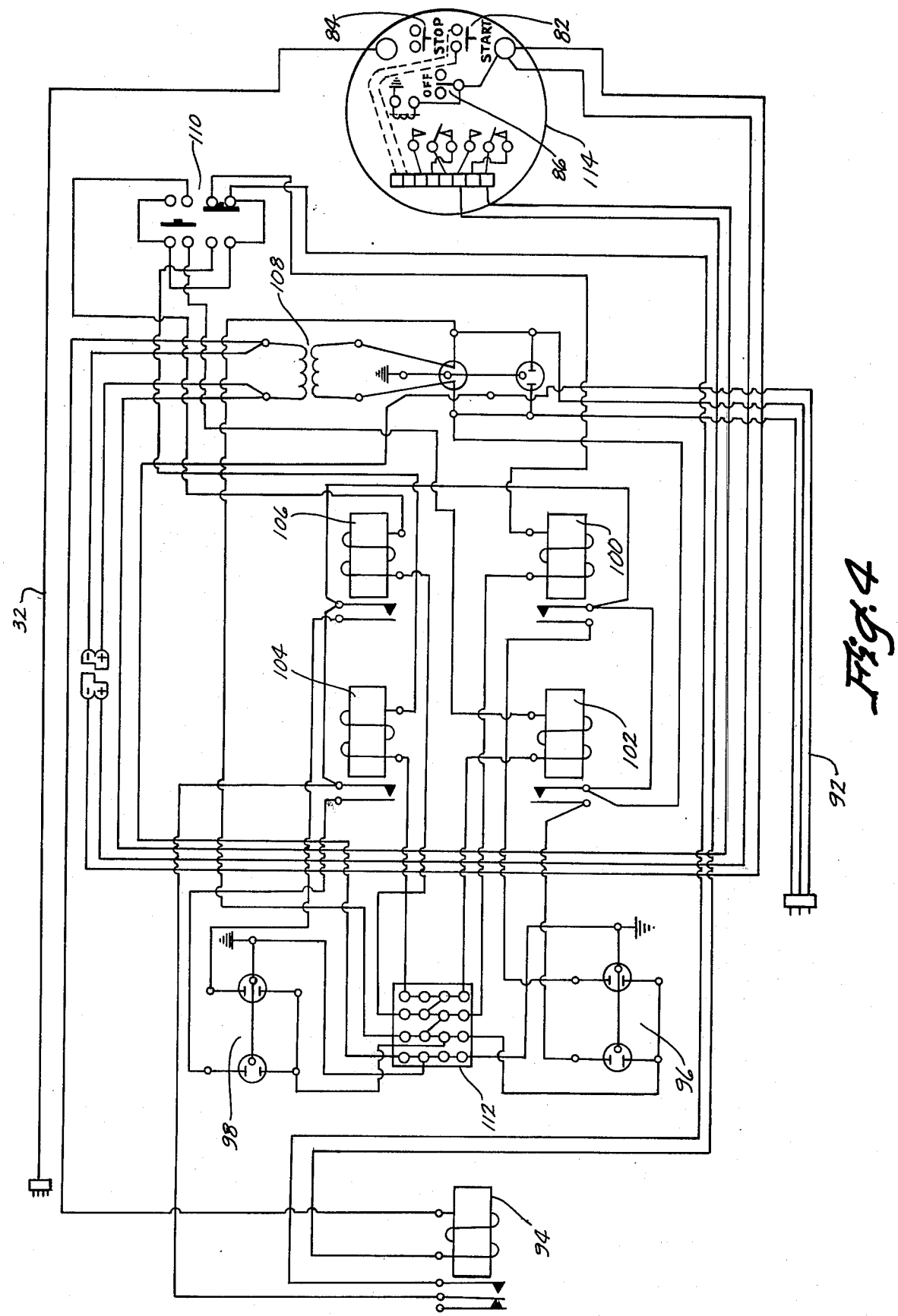
FIG. 4 is a schematic of the electrical circuitry of the invention.

FIG. 4 illustrates the electrical circuitry located within the impregnator control console box and it can be seen that the numeral 92 refers to a power cord 92 extending from the box which is connected to a source of 115 volt electrical current. Although the electrical circuitry of FIG. 4 will not be described in detail, certain of the components therein will be described to enable the invention to be more fully appreciated. The numeral 94 refers to a Model KRP5DG Potter Brumfield general relay while the numerals 96 and 98 refer to duplex receptacles located at the back of the box into which the cords 66, 68, 70 and 72 are plugged by means of suitable extension cords. Relays 100, 102, 104 and 106 are provided for controlling the operation of the motors 58, 60, 62 and 64 respectively. Converter 108 converts the 115 volt alternating current to 12 volts direct current. Control block 110 is provided as is the terminal block 112. The numeral 114 refers generally to a batch controller such as manufactured by Signet Scientific and identified as Model MK303-150. The batch controller 114 includes the means for presenting the digital readout as well as the accumulator and the countdown features.

Figure 2:
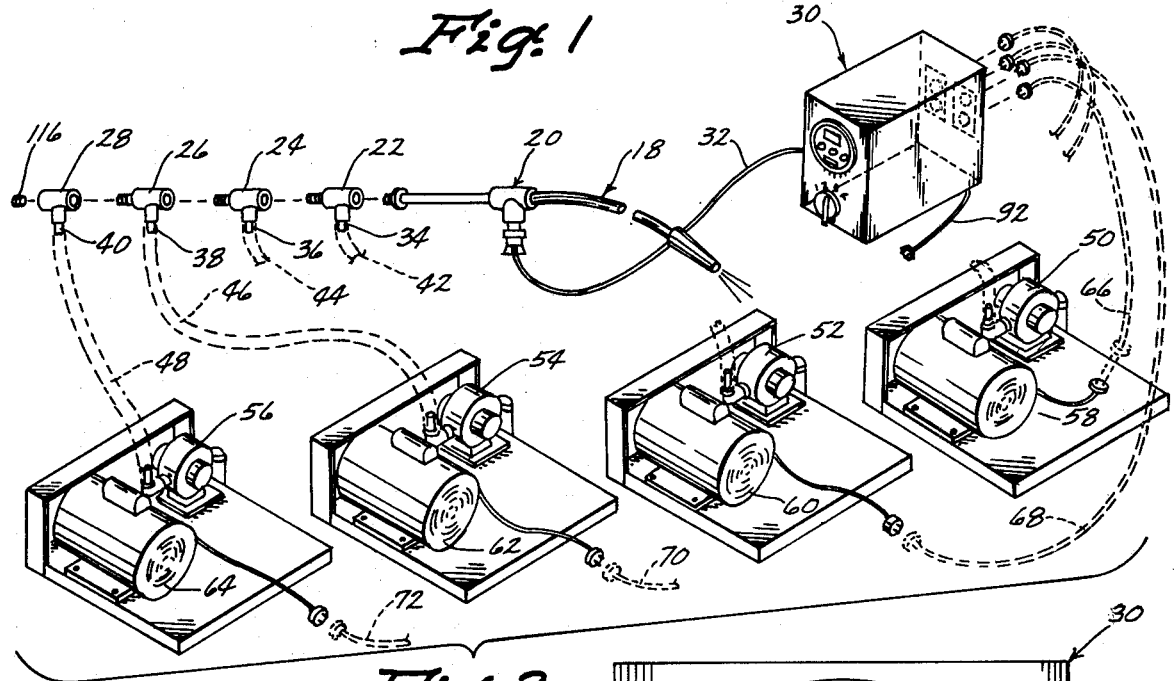
FIG. 2 is a partial perspective view of the individual pumps and batch controller.
Figure 3:
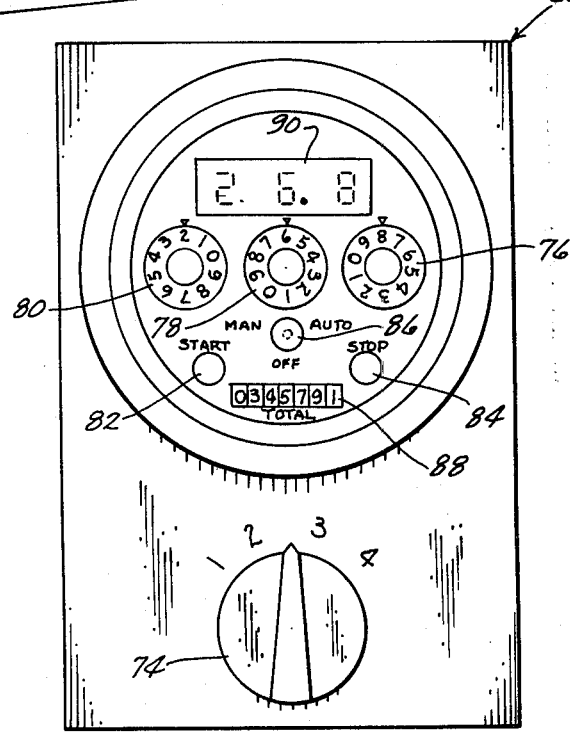
FIG. 3 is a front view of the batch controller console.

In operation, the components of the system would be connected as illustrated in FIGS. 1 and 2. Assuming that pump 50 is the pump connected to the liquid chemical which is desired to be supplied to the mixing drum 16, the dial 74 is rotated to the "1" position. In position "1", only pump 50 will be operated since power is supplied only to motor 58 and will not be supplied to the motors 60, 62 and 64. After the amount of liquid chemical to be supplied to the mixing drum 16 has been determined, the dials 76, 78 and 80 are rotated to that desired volume. The readout 90 is illuminated when switch 86 is "on" but is not correct with dial settings until start button 82 is depressed. The switch 86 is then moved from the "off" position to the manual position. The start button 82 is then depressed which closes the electrical circuit so that the pump motor 58 is activated. The readout 90 then correctly registers the desired volume which in this case is 268 pints. As soon as the pump primes and forces liquid past the paddle wheel flow sensor 20, the LED display 90 will count the flow backwards until zero. If the pump does not prime, the meter display will not change from its "start" setting. If the liquid supply is empty, the display will stop at the point it runs out of liquid, but the pump will continue to run and must be stopped with the "stop" button 84 to prevent pump damage from dry operation.

The stop button 84 will stop the system before it reaches its normal stop position (zero) whenever it is pressed. If the stop button 84 is used, the meter will reset back to the original setting when "start" is pushed.

As stated, the meter or readout counts backwards until zero is reached. As soon as zero is reached, the electrical relay circuit is opened which stops the electrical motor 58. The check valves 34, 36, 38 and 40 prevent the liquid of one pump from entering the line and the supply container of another pump. If a flush of the flow sensor area common to all the pumps is required, the additional check valve fitting 116 may be used to flush the same.

Thus it can be seen that an impregnator system has been described which utilizes a batch controller and a paddle wheel flo-sensor system to electronically measure and automatically control pints of liquid chemical pumped by 1, 2, 3 or 4 independent pumping systems. The invention described herein permits the precise addition of liquid chemicals to the dry fertilizer in a convenient and extremely reliable fashion. Thus it can be seen that the invention accomplishes at least all of its stated objectives.

We claim:
1. In combination,
a fertilizer blending means including a mixing drum for mixing the dry ingredients of a batch of dry fertilizer,
a plurality of electrically driven pumps having their intakes in communication with respective sources of liquid chemicals,
a discharge line extending from the discharge side of each of said pumps,
a liquid line having a discharge portion in communication with the interior of said mixing container,
said discharge lines being in communication with said liquid line,
a check valve in each of said discharge lines adjacent its connection with said liquid line for preventing flow from said liquid line to the associated pump,
an electronic flow sensor means in said liquid line downstream of the connection between said discharge lines and said liquid line for sensing the rate of flow therethrough,
a control means operatively connected to said flow sensor means and to each of said pumps for selectively activating one of said pumps and for deactivating the said one pump when the preselected volume of liquid has passed through said flow sensor means,
said control means including a selection switch corresponding to the plurality of pumps for selecting the desired pump to be activated; a manually operated dial means for selecting the units of volume of liquid to be pumped by the said pump; a readout means which initially indicates the selected units of volume when said pump is activated; and a countdown means which counts down the units of volume passing through said flow sensor means and sensed thereby; and circuit interruption means for deactivating said pump when the countdown means has caused the readout means to reach zero.

* * * * *